(12) United States Patent
Seto

(10) Patent No.: US 6,269,298 B1
(45) Date of Patent: Jul. 31, 2001

(54) APPARATUS AND METHOD FOR PERFORMING AUTOMATIC CONTROL OVER VELOCITY OF AUTOMOTIVE VEHICLE

(75) Inventor: Yoji Seto, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/359,373

(22) Filed: Jul. 23, 1999

(30) Foreign Application Priority Data

Jul. 23, 1998 (JP) .................................................. 10-207753

(51) Int. Cl.[7] .................................................. B60K 31/08
(52) U.S. Cl. .............................. 701/96; 300/301; 342/69; 342/70
(58) Field of Search ........................... 701/96, 300, 301; 180/169, 170, 167; 348/118; 342/69, 70; 700/302, 307; 702/165

(56) References Cited

U.S. PATENT DOCUMENTS 5,529,139 * 6/1996 Kurahashi et al. ................... 180/169

FOREIGN PATENT DOCUMENTS

| 60-121130 | 6/1985 | (JP) . |
| 5-156975 | 6/1993 | (JP) . |
| 5-159198 | 6/1993 | (JP) . |
| 7-89367 | 4/1995 | (JP) . |

* cited by examiner

Primary Examiner—William A. Cuchlinski, Jr.
Assistant Examiner—Arthur D. Donnelly
(74) Attorney, Agent, or Firm—Foley & Lardner

(57) ABSTRACT

In automatic vehicular velocity control apparatus and method for an automotive vehicle, a controller is responsive to the detection of a new preceding vehicle by an inter-vehicle distance detector and programmed to derive a target motion of the vehicle until a present relationship between the vehicle and the new preceding vehicle becomes a relationship between the vehicle and the preceding vehicle in a steady state and to adjust a vehicular variation rate in such a manner that the motion of the vehicle gives the target motion of the vehicle. In a embodiment, a target value of a vehicular acceleration/deceleration is calculated as the target motion of the vehicle.

20 Claims, 12 Drawing Sheets

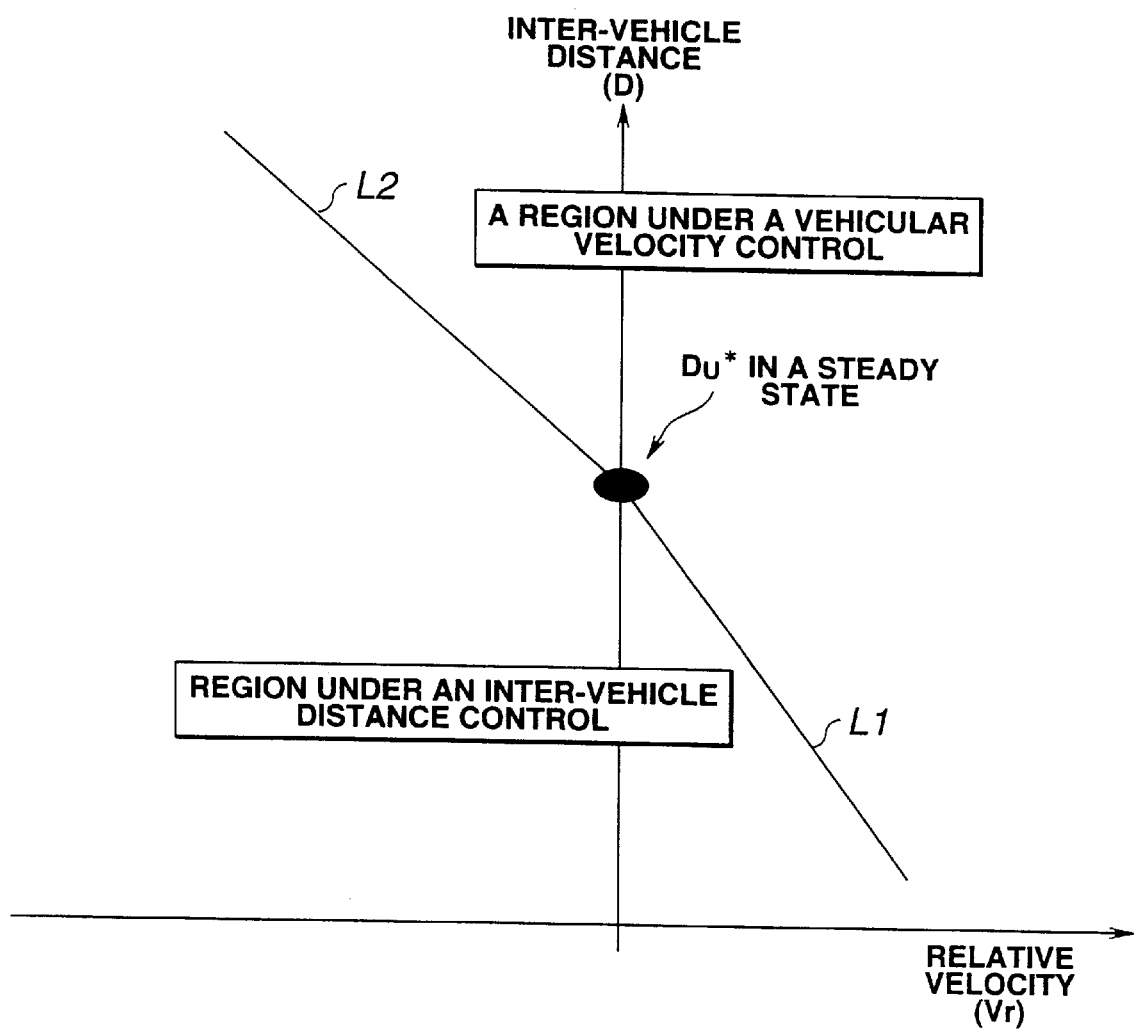

APPARATUS AND METHOD FOR PERFORMING AUTOMATIC CONTROL OVER VELOCITY OF AUTOMOTIVE VEHICLE

BACKGROUND OF THE INVENTION a) Field of the Invention

The present invention relates to apparatus and method for performing an automatic control over a velocity f an automotive vehicle in which the apparatus is mounted o as to maintain an inter-vehicle distance from the vehicle to another vehicle running ahead of the vehicle to follow up the other vehicle.

b) Description of the Related Art

A Japanese Patent Application First Publication No. Showa 60-121130 published on Jun. 28, 1985 exemplifies a first previously proposed vehicular velocity controlling apparatus.

In the first previously proposed vehicular velocity controlling apparatus disclosed in the above-identified Japanese Patent Application First Publication, a vehicular velocity of the vehicle is detected, a safe inter-vehicle distance is calculated on the basis of the detected vehicular velocity, an actual inter-vehicle distance from the vehicle to a preceding vehicle which is running ahead of the vehicle is calculated, a variation rate of the inter-vehicle distance per predetermined time is calculated from the detected Inter-vehicle distance, the safe inter-vehicle distance is corrected according to the variation rate of the inter-vehicle distance, and the vehicular velocity of the vehicle is adjusted according to a difference between the corrected safe inter-vehicle distance and the actual inter-vehicle distance.

Since, in the first previously proposed vehicular velocity controlling apparatus, the vehicular velocity is determined only from the safe inter-vehicle distance and the actual inter-vehicle distance, a vehicular velocity of the vehicle does not always match with a sense of a vehicular occupant (s) and a disagreeable feeling is left to the vehicular occupant when a relationship of the vehicle to the preceding vehicle is abruptly changed in such a way that another vehicle which has run on another traffic lane is interrupted before the vehicle or that the vehicle has made a traffic lane change to another traffic lane.

To solve the above-described dismatch with the sense of the vehicular occupant(s) and disagreeable feeling left to him, second, third, and fourth vehicular velocity controlling apparatuses have been proposed.

A Japanese Patent Application First Publication No. Heisei 7-89367 published on Apr. 4, 1995 exemplifies the second previously proposed vehicular velocity controlling apparatus.

A Japanese Patent Application First Publication No. Heisei 5-156975 published on Jun. 22, 1993 exemplifies the third previously proposed vehicular velocity controlling apparatus.

A Japanese Patent Application First Publication No. Heisei 5-159198 published on Jun. 25, 1993 exemplifies the fourth previously proposed vehicular velocity controlling apparatus.

In the second previously proposed vehicular velocity controlling apparatus, such a preceding vehicle follow-up run control that the vehicular velocity is adjusted so that the inter-vehicle distance from the vehicle to the preceding vehicle which is running ahead of the vehicle on the same traffic lane gives a predetermined value is carried out and, in addition to this, a cruise speed control such that a constant vehicular velocity run at a preset set vehicular velocity is carried out if no preceding vehicle is trapped. Then, when another vehicle is interrupted before the vehicle under the follow-up run control or under the cruise speed control, control is transferred to such a special interrupt control that an engine throttle valve is completely closed for a constant period of time to effect an engine braking so that the vehicle is moderately decelerated. Consequently, the interrupt vehicle can smoothly be interposed in a front area of the vehicle on the same traffic lane as the vehicle.

In the third previously proposed vehicular velocity controlling apparatus, a target value of the inter-vehicle distance is calculated on the basis of the vehicular velocity and a relative velocity of the vehicle to the preceding vehicle and the vehicular velocity of the vehicle is adjusted so that the vehicular velocity is made congruent with the target value of the inter-vehicle distance.

In a case where a deceleration control to decelerate the vehicle is carried out due to the interrupt of the other vehicle, the deceleration control is halted even if the inter-vehicle distance is below the target value of the inter-vehicle distance in a case where this deceleration control is equal to or above a predetermined value or in a case where the deceleration control is continued for a predetermined period of time and a vehicular velocity variation control is carried out to make the vehicular velocity of the vehicle equal to that of the preceding vehicle.

Furthermore, in the fourth previously proposed vehicular velocity controlling apparatus, suppose that the vehicle makes a traffic lane change from a normal running lane to an over-head lane to overhead the preceding vehicle. In this case, the inter-vehicle distance to the preceding vehicle after the traffic lane change is modified as the target value of the inter-vehicle distance and the inter-vehicle distance is maintained within a time duration to the end of the over-head motion of the vehicle.

After the end of the over-head motion of the vehicle, the inter-vehicle distance is extended gradually with time to the normally determined target value of the inter-vehicle distance.

Hence, the inter-vehicle distance after the lane change is maintained and a quick approach to the vehicle from a following vehicle which is running behind the vehicle can be prevented.

SUMMARY OF THE INVENTION

However, since, in the second previously proposed vehicular velocity controlling apparatus, the engine throttle valve is completely closed to effect the engine braking so as to decelerate the vehicle when the interrupt of the other vehicle before the vehicle occurs.

In a case where the vehicle runs on a descending slope, the vehicle runs on a relatively low vehicular velocity region, or the preceding vehicle is decelerated, and the deceleration of the preceding vehicle occurs, a full deceleration of the vehicle cannot be achieved so that the inter-vehicle distance cannot be widened or, on conversely, the inter-vehicle distance is narrowed. Then, the disagreeable feeling is given to the vehicular occupant(s). In addition, even when the preceding vehicle whose vehicular velocity is higher than that of the vehicle has appeared in the front detection zone of the inter-vehicle distance due to the traffic lane change of the vehicle, the throttle valve is forced into the completely closed state to effect the engine braking so as to decelerate the vehicle. In this case, the vehicle becomes too far away from the preceding vehicle and the is agreeable feeling is given to the vehicular occupants).

In addition, since, in the third previously proposed vehicular controlling apparatus, a large deceleration control is carried out to halt the deceleration control or the deceleration is halted after the large deceleration is continued for the predetermined time, a strong deceleration (viz., a gradient of the vehicular velocity with respect to time is large) is initially carried out. Consequently, the disagreeable feeling is given to the vehicular occupant(s).

Furthermore, since, in the fourth previously proposed vehicular velocity controlling apparatus, the inter-vehicle distance to the preceding vehicle which is the preceding vehicle running ahead of the vehicle on the traffic lane onto which the vehicle has made the traffic lane change is modified to the target value of the inter-vehicle when the vehicle has made the traffic lane change, an abrupt acceleration of the vehicle occurs in a case where the vehicular velocity of another vehicle appearing in the front detection zone of the inter-vehicle distance is very higher than the vehicular velocity of the vehicle if the other vehicle appears in the front detection zone.

Hence, the disagreeable feeling is given to the vehicular occupant(s). Since the vehicle is accelerated with the inter-vehicle distance shortened, the further disagreeable feeling is given to the vehicular occupant(s).

It is, therefore, an object of the present invention to provide a vehicular velocity controlling apparatus and method for an automotive vehicle which can provide a vehicular motion matching with a vehicular driver's vehicular drive feeling when an interrupt of another vehicle from another traffic lane to the traffic lane on which the vehicle is running occurs and which can provide an appropriate vehicular motion to prevent positively the disagreeable feeling from being given to the vehicular occupant(s) when the vehicle has made the traffic lane change to the other traffic lane to be interrupted before the preceding vehicle.

The above-described object can be achieved by providing a control apparatus for an automotive vehicle, comprising: an inter-vehicle distance detector to detect an actual inter-vehicle distance which is running ahead of the vehicle on the same traffic lane as the vehicle; and a controller programmed to: calculate a target value of a vehicular velocity variation rate on the basis of the actual value of the inter-vehicle distance and a target value of the same; perform a follow-up run control for the vehicle to follow up the preceding vehicle according to the target value of the vehicular velocity variation rate and to maintain the inter-vehicle distance from the vehicle to the preceding vehicle at the target value of the same; responsive to a detection of a new preceding vehicle by the inter-vehicle distance detector, calculate a target motion of the vehicle until a present relationship between the vehicle and the new preceding vehicle becomes a relationship between the vehicle and the preceding vehicle in a steady state; and adjust the vehicular velocity variation rate in such a manner that the vehicular motion becomes the target vehicular motion.

The above-described object can also be achieved by providing a control method for an automotive vehicle, comprising: detecting an actual inter-vehicle distance from the vehicle to a preceding vehicle which is running ahead of the vehicle on the same traffic lane as the vehicle; calculating a target value of a vehicular velocity variation rate on the basis of the actual value of the inter-vehicle distance and a target value of the same; performing a follow-up run control for the vehicle to follow up the preceding vehicle according to the calculated target vehicular velocity variation rate; maintaining the inter-vehicle distance from the vehicle to the preceding vehicle at the target value of the same; when detecting the new preceding vehicle, deriving a target motion of the vehicle until a present relationship between the vehicle and the new preceding vehicle gives the relationship between the vehicle and the preceding vehicle in a steady state; and adjusting the vehicular variation rate in such a manner that the motion of the vehicle gives the derived target motion of the vehicle.

BRIEF DESCRIPTION OF THE DRAWINGS

FIG. 10 is an explanatory view representing a control map to select one of either a vehicular velocity control or an inter-vehicle distance control on the basis of the relative velocity and the inter-vehicle distance.

FIG. 11 is an explanatory view of a memory table to determine an inter-vehicle distance which enables an acceleration of the vehicle through an automatic vehicular velocity controlling apparatus in the second embodiment.

DETAILED DESCRIPTION OF THE PREFERRED EMBODIMENTS

Reference will hereinafter be made to the drawings in order to facilitate a better understanding of the present invention.

First Embodiment

Figure 1A:
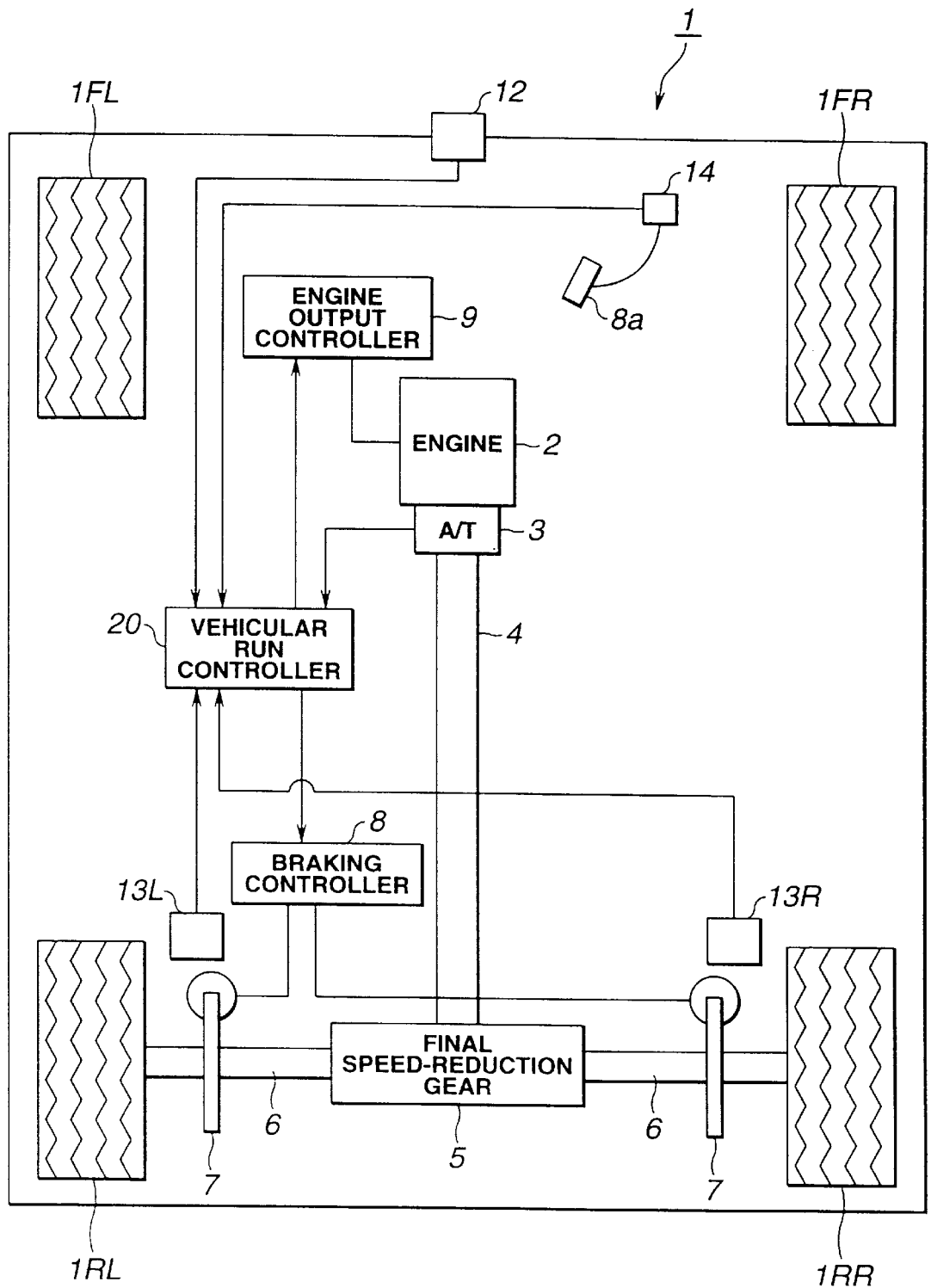
FIG. 1A is a schematic circuit block diagram of a first preferred embodiment of an automatic vehicular velocity controlling apparatus.

FIG. 1A shows a schematic circuit block diagram of a first preferred embodiment of an automatic vehicular velocity controlling apparatus according to the present invention applicable to a rear wheel drive vehicle.

In FIGS. 1A, 1FL and 1FR denote front left and right road wheels as non-driven road wheels and 1RL and 1RR denote rear left and right road wheels as driven road wheels. A driving force of a prime mover, viz., an engine 2 is transmitted to the rear left and right road wheels 1RL and 1RR via an automatic transmission (A/T) 3, a propeller shaft 4, a final differential gear 5, and road wheel axles 6 so as to rotatably drive these driven wheels 1RL and 1RR.

In FIG. 1A, disc brakes 7 are respectively disposed on the rear left and right road wheels 1RL and 1RR so as to develop braking forces thereon and a braking controller 8 is installed to control a braking liquid pressure applied to these disc brakes 7, the braking forces being developed by means of the braking liquid pressure.

The braking controller 8 develops the braking liquid pressure in accordance with a depression depth of a brake pedal 8a and also in accordance with a braking liquid pressure command value outputted from a preceding vehicle follow-up run controller (also called, a vehicular run controller) 20 as will be described later.

In addition, an engine output controller 9 is installed on the vehicle 1 to control an output of the engine 2. The engine output controller 9 includes a throttle valve actuator for actuating an engine throttle valve to be adjustably opened or closed so as to manage an engine revolution speed or an engine idling valve controller for controlling an opening degree of an idling valve of the engine 2 to manage an revolution speed of the engine during an engine idling condition. In the first embodiment, the former control method of adjusting an opening degree of the throttle valve is adopted.

On the other hand, each road wheel velocity sensor 13FL and 13FR is installed to detect a corresponding front road wheel velocity of the front left and right road wheels 1FL and 1FR. Each road wheel velocity sensor 13RL and 13RR is also installed to detect a corresponding rear road wheel velocity of the rear left and right road wheels 1RL and 1RR. Furthermore, a brake switch 14 to detect the depression of a foot brake pedal 8a is installed on the vehicle 1.

An inter-vehicle distance sensor 12 constituted by a radar unit is disposed on a front lower side of a vehicle body of the vehicle to detect an inter-vehicle distance from the vehicle to another vehicle which is running ahead of the vehicle at the same traffic lane as the vehicle(also called, a preceding vehicle).

Each output signal of the inter-vehicle distance sensor 12, the road wheel velocity sensors 13L and 13R, and the brake pedal switch is inputted to the vehicular run controller 20. The vehicular run controller 20 transmits command value signals to either or each of the braking controller 8 and the engine output controller 9 on the basis of the inter-vehicle distance D detected by means of the inter-vehicle distance sensor 12 and road wheel velocities $V_{WL}$ and $V_{WR}$ detected by means of the road wheel velocity sensors 13L and 13R so that a steady state preceding vehicle follow-up run control is carried out maintaining an appropriate inter-vehicle distance and when, during the preceding vehicle follow-up run control, a new preceding vehicle is detected, the vehicle is returned to be under the steady state follow-up run control with an appropriate acceleration/deceleration carried out in accordance with a running state of the new preceding vehicle.

Figure 1B:
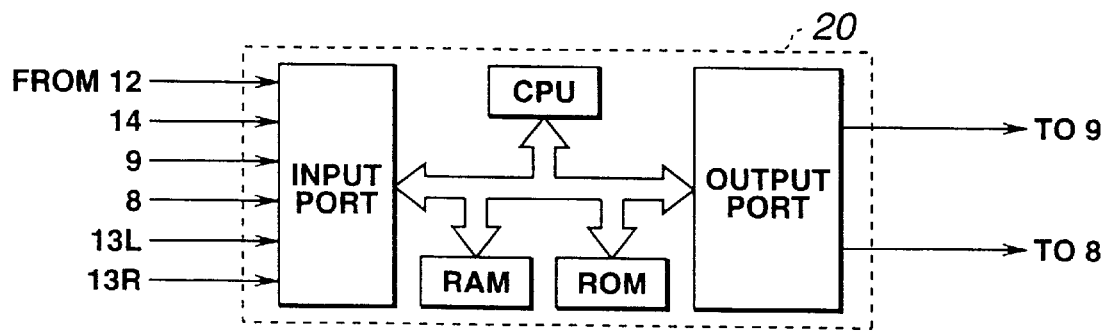
FIG. 1B is a schematic circuit block diagram of a controller shown in FIG. 1A.

FIG. 1B shows a schematic circuit block diagram of the vehicular run controller 20.

The vehicular run controller 20 includes a microcomputer having a CPU (Central Processing Unit), a RAM (Random Access Memory), a ROM (Read Only Memory), an Input Port, an Output Port, and a common bus and the vehicular state controller 19 has the same circuits as the vehicular run controller 20, as shown in FIG. 1B. The CPU is generally operated in accordance with programs stored in the ROM and in accordance with internal and external interrupt requests.

Figure 2:
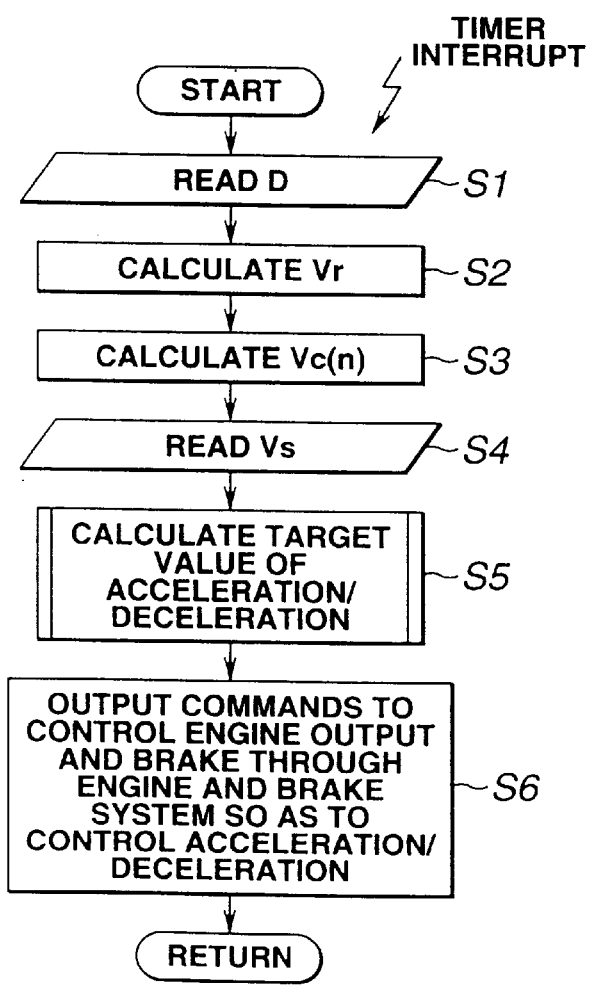
FIG. 2 is an operational flowchart of an internal timer interrupt routine executed in the controller shown in FIG. 1B.

Next, FIG. 2 shows a follow-up run control processing executed as a timer interrupt routine activated whenever a predetermined period of time (e.g., 10 milliseconds) has passed during a run of a predetermined main routine.

That is to say, at a step S1, the CPU of the controller 20 reads an actual inter-vehicle distance D from the vehicle to another vehicle which is running ahead of the vehicle on the same traffic lane as the vehicle 1 (hereinafter, referred to as the preceding vehicle).

At a step S2, the CPU of the controller 20 calculates a relative velocity Vr of the vehicle to the preceding vehicle by differentiating the read inter-vehicle distance.

At a step S3, the CPU of the controller 20 reads road wheel velocities $V_{WL}$ and $V_{WR}$ almost simultaneously to derive an average value thereof to calculate a vehicular velocity Vc(n).

At a step S4, the CPU of the controller 20 reads a set vehicular velocity Vs preset by a vehicular driver.

At a step S5, the CPU of the controller 20 calculates a target value of a vehicular acceleration/deceleration with a sign (viz., a vehicular velocity variation rate).

At the subsequent step S6, the CPU of the controller 20 calculates a target value of a vehicular acceleration/deceleration with a sign (viz., a vehicular velocity variation rate).

At the subsequent step S6, the CPU of the controller 20 outputs a command value to adjust the vehicular velocity variation rate through either an engine throttle valve or a brake system on the basis of the calculated target acceleration/deceleration.

Then, upon the completion of the step S6, the routine is returned to the predetermined main routine.

Figure 3:
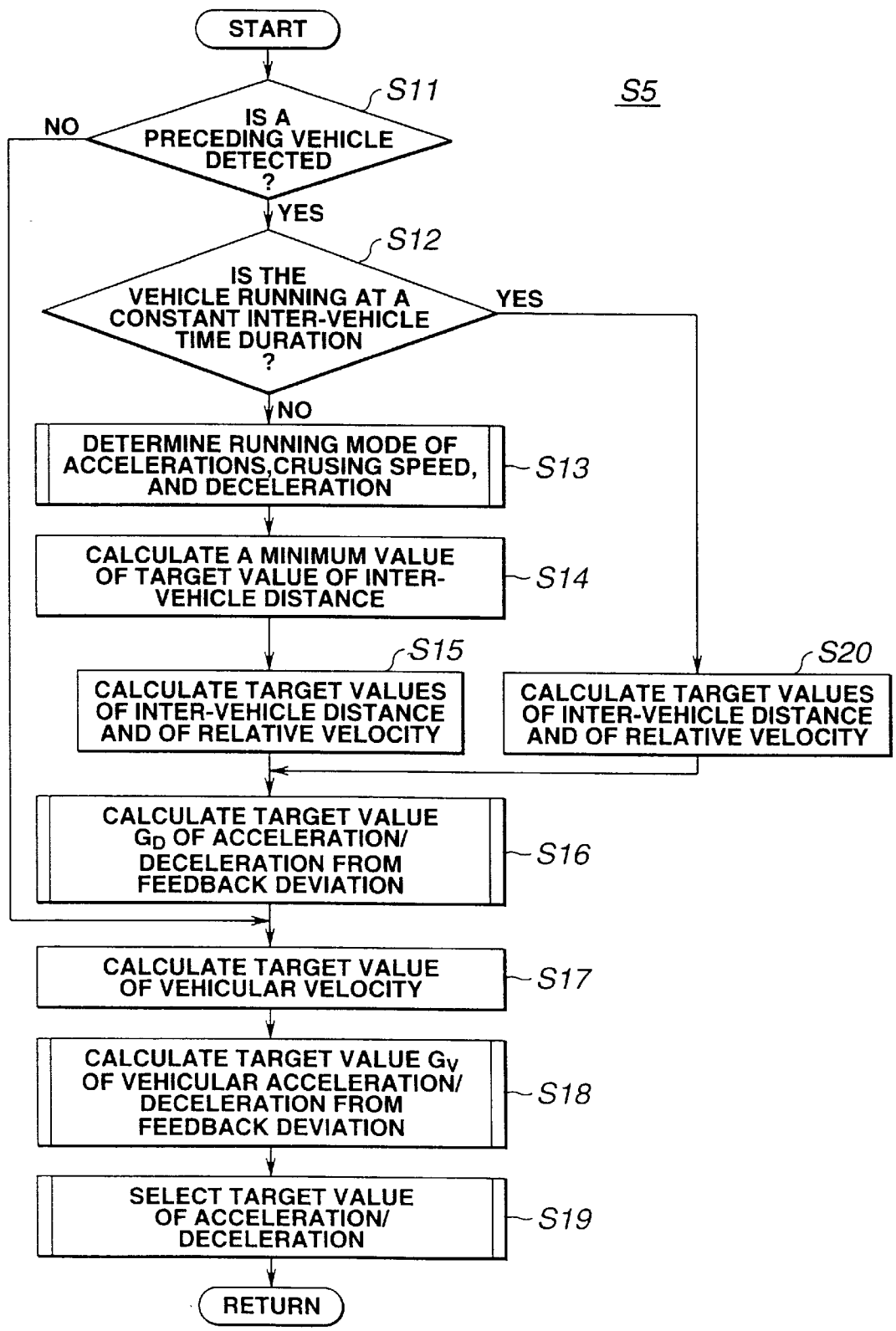
FIG. 3 is another operational flowchart of a subroutine at a step S5 shown in FIG. 2.

In the target acceleration/deceleration calculating procedure at the step S5, the routine goes to a subroutine shown in FIG. 3.

That is to say, as shown in FIG. 3, the CPU of the controller 20 determines whether the preceding vehicle has been detected at a step S11.

This decision step S11 is based on whether the inter-vehicle distance D read at the step S1 falls within a detection limit value DA that the inter-vehicle distance sensor has.

If D>$D_{MAX}$ (No) at the step S11, the CPU of the controller 20 determines that there is no preceding vehicle in a front detection zone of the inter-vehicle distance sensor 12 and the routine jumps to a step S17.

If D≦$D_{MAX}$ (Yes) at the step S11, the CPU of the controller 20 determines that the preceding vehicle is present in the front detection zone and the routine goes to a step S12.

At a step S13, the CPU of the controller 20 determines whether the vehicle is running at a constant inter-vehicle time duration. That is to say, at the step S13, the CPU of the controller 20 determines whether both conditions of absolute value of a relative velocity Vr which is smaller than a predetermined value Vrs (|Vr|<Vrs) and an absolute value of a deviation between the inter-vehicle distance D and a target value of the inter-vehicle distance Du* in a steady state previously set which is below a predetermined value ΔDs (|Du*−D|<ΔDs). If the above-described conditions are not satisfied (No), the CPU of the controller 20 determines that the vehicle is not running at the constant inter-vehicle time duration and the routine goes to a step S13.

Figure 7:
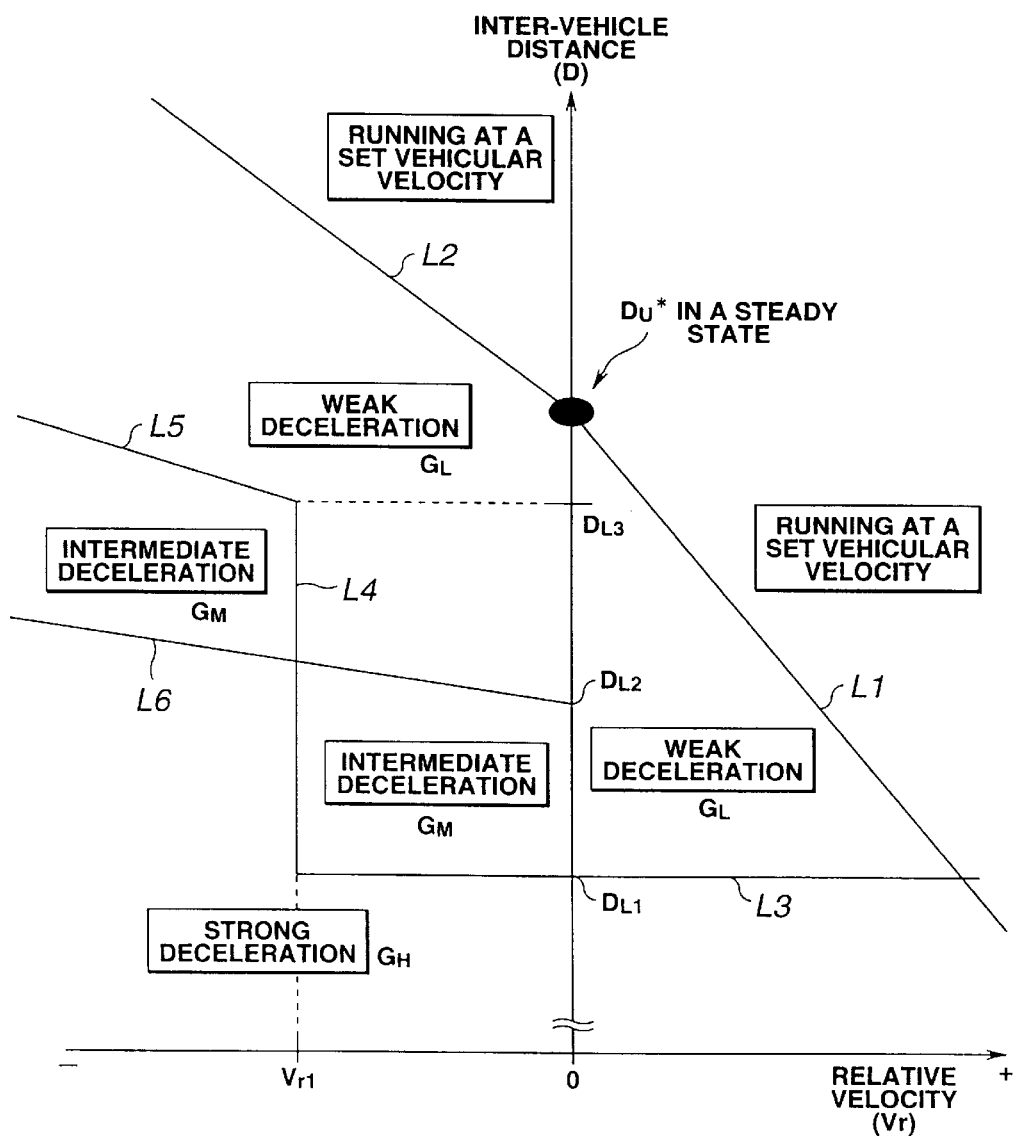
FIG. 7 is a control map to set a vehicular run condition on the basis of a relative velocity and an inter-vehicle distance to which the controller shown in FIG. 1B refers.

At the step S13, the CPU of the controller 20 refers to a control map shown in FIG. 7 on the basis of a relative velocity Vr of the vehicle to the preceding vehicle and an inter-vehicle distance from the vehicle 1 to the preceding vehicle to select a running mode of any one of the acceleration, maintaining the present vehicular velocity (without acceleration nor deceleration), and the deceleration.

As shown in FIG. 7, the control map has a lateral axis taken as the vehicular velocity Vr and a longitudinal axis taken as the inter-vehicle distance D. Suppose that a target inter-vehicle distance Du* in a steady state when the relative velocity vr indicates "0" is an intercept on the inter-vehicle distance axis within a positive range of the relative velocity Vr, as shown in FIG. 7. At this time, a straight line L1 having a relatively large negative gradient is set to be extended from the intercept value of Du*.

A small negative characteristic straight line L2 is set to be extended from the value of Du* within a negative zone of the relative velocity Vr. A horizontal line L3 which passes an inter-vehicle distance value $D_{L1}$ smaller than the target inter-vehicle distance Du* in the steady state with a small range of the relative velocity Vr and having one end being intersected to the straight line L1 is set. A parallel vertical line L4 which is parallel to the longitudinal axis and is extended vertically from the other end of the straight line L3 up to a predetermined inter-vehicle distance $D_{L3}$ which is smaller than the target inter-vehicle distance Du* in the steady state but larger than another predetermined inter-vehicle distance $D_{L2}$ is placed on a point of the inter-vehicle distance axis which is nearer to the predetermined inter-vehicle distance $D_{L1}$ with respect to a middle point between $D_{L3}$ and $D_{L1}$.

A straight line L6 which passes an intermediate point of the vertical straight line L4, the other predetermined inter-vehicle distance $D_{L3}$, and the other predetermined inter-vehicle distance $D_{L2}$ and having the gradient smaller than that of the straight line L5 is set.

Then, the vehicle is set to run at the set vehicular velocity Vs when both of the inter-vehicle distance and the relative velocity fall in an upper region defined by the straight lines L2 and L1 of FIG. 7.

The vehicle is set to run at a weak deceleration (the value of the deceleration is relatively low) when both of the inter-vehicle distance D and the relative velocity Vr fall in a triangular region enclosed by the longitudinal axis, the straight lines L1 and L3.

The vehicle is set to run at the weak deceleration when both of the inter-vehicle distance and the relative velocity fall in a region enclosed by the straight line L2, the longitudinal axis, the straight line L6, the straight line L4, and the straight line L5.

The vehicle is set to run at a strong deceleration (the value of the deceleration is relatively high) when both of the inter-vehicle distance and the relative velocity fall in a region enclosed by the straight line L2, the longitudinal axis, the straight lines L6, L4, and L5.

The vehicle is set to run at the weak deceleration when both of the inter-vehicle distance and the relative velocity fall in a region enclosed by the straight lines L2 and L6, the longitudinal line, and in a region enclosed by the straight lines L4 and L5.

Furthermore, the vehicle is set to run at an intermediate deceleration between the strong and weak decelerations in a region enclosed by the straight lines L5, L4, and L6 and in a region enclosed by the straight line L3 and longitudinal axis.

Next, referring back to FIG. 3, at the step S14, the CPU of the controller 20 multiplies the vehicular velocity Vc(n) by the predetermined value T2 to calculate a minimum value of the target inter-vehicle distance $D^*_{MIN}$ (=Vc(n)×T2).

The routine goes to a step S15 in which the CPU of the controller 20 calculates an orbit of both of the target value of the inter-vehicle distance and the relative velocity from the transient state to the steady state in accordance with the equation (2).

It is noted that in order to achieve the weak deceleration, the CPU of the controller 20 integrates the target value of the deceleration $G_L$ derived at the step S13 with the present relative velocity Vr and the inter-vehicle distance D as initial values to derive a target value Vr* of the relative velocity and further integrates the target value Vr* to derive a target value D* of the inter-vehicle distance.

On the other hand, in a case where the strong deceleration is carried out, the CPU of the controller 20 calculates an orbit of the target inter-vehicle distance and the target relative velocity in the transient state such that the inter-vehicle distance is not shorter than the minimum value Dmin* from the minimum value of the target inter-vehicle distance, the present inter-vehicle distance D, and the relative velocity Vr.

For example, the CPU of the controller 20 calculates a deceleration $G_H$ ($G_L$) to prevent the inter-vehicle distance D from being shorter than a minimum value $D^*_{MIN}$ of the target inter-vehicle distance in accordance with the equation (2) and integrates the deceleration $G_L$ ($G_H$) to derive the target value Vr* of the relative velocity and further integrates the target value Vr* of the relative velocity to derive the target value D* of the inter-vehicle distance.

$$G_L(G_H)=Vr^2/2(D_{MIN}*-D) \qquad (2).$$

Next, the routine goes to a step S16.

At the step s16, the CPU of the controller 20 calculates a target acceleration/deceleration Gn for the vehicle to run with the target relative velocity $V_T^*$ and the target inter-vehicle distance D* as a subroutine.

Figure 4:
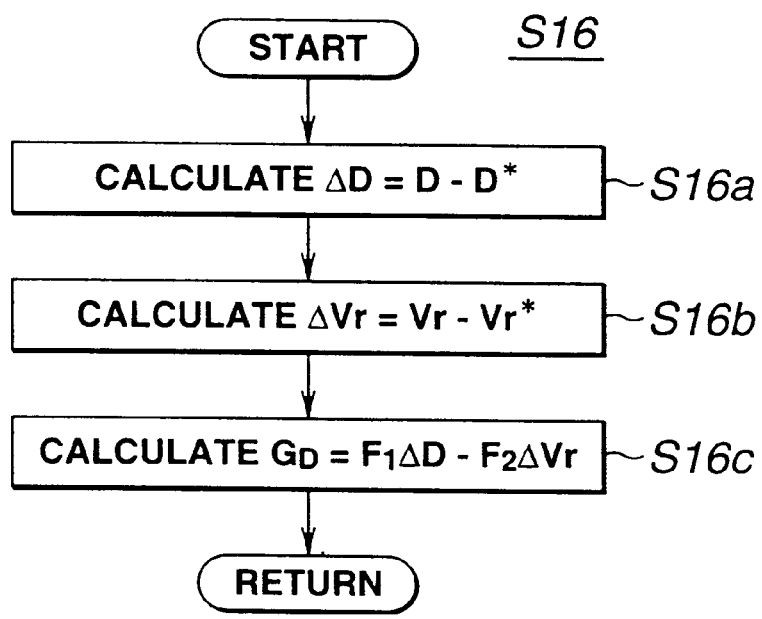
FIG. 4 is another operational flowchart of a subroutine at a step S16 shown in FIG. 2.

As shown in FIG. 4 which shows the subroutine at the step S16, the CPU of the controller 20 calculates a deviation ΔD (of the inter-vehicle distance D* from the actual inter-vehicle distance D (ΔD=D−D*) at a step S16a.

Next, the routine goes to a step S16b.

At the step S16b, the CPU of the controller 20 calculates a deviation ΔVr of the relative velocity by subtracting the target relative velocity Vr as follows:

$$\Delta Vr(=Vr-Vr^*).$$

It is noted that the actual relative velocity Vr is derived by the differentiation of the inter-vehicle distance D as described above.

Thus, at the subsequent step S16c, the CPU of the controller 20 calculates the target acceleration/deceleration $G_D$ in accordance with the equation (3) and the routine goes to a step S17 shown in FIG. 3.

$$G_D=F_1\Delta D+F_2\Delta Vr \qquad (3),$$

wherein $F_1$ and $F_2$ denote control gains.

Then, at the step S17, the CPU of the controller 20 calculates a target value Vc* of the vehicular velocity.

The calculation of the target value Vc* is carried out in such a manner that the target value Vc* is calculated so that the vehicular velocity is increased at a constant acceleration from the present vehicular velocity Vc(n) up to the set vehicular velocity Vs when the vehicular velocity Vc(n) is lower than the set vehicular velocity Vs. If not so, the target value Vc* of the vehicular velocity is set to be equal to the set vehicular velocity Vs.

Next, the routine goes to a step S18. At the step S18, the CPU of the controller 20 calculates the target value Gv of the vehicular acceleration/deceleration on the basis of the target value Vc* of the vehicular velocity as a subroutine shown in FIG. 5.

Figure 5:
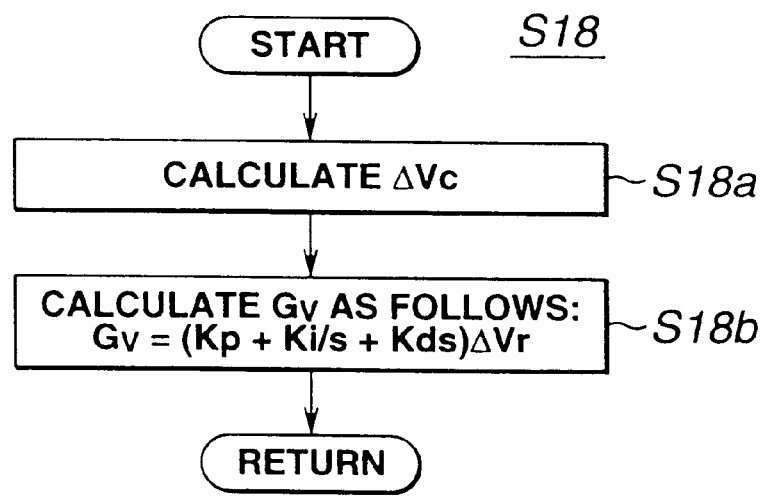
FIG. 5 is another operational flowchart of a subroutine at a step S18 shown in FIG. 2.

As shown in FIG. 5, the CPU of the controller 20 subtracts the actual vehicular velocity Vc(n) from the target value Vc* of the vehicular velocity to derive a deviation ΔVc of the vehicular velocity (ΔVc=Vc*−Vc(n)) at a step S18a.

Next, at the next step S18b, the CPU of the controller 20 calculates the following equation (4) on the basis of the deviation ΔVc of the vehicular velocity.

Then, the routine goes to a step S19 of FIG. 3 to derive the target acceleration/deceleration Gv to perform the vehicular acceleration control.

$$Gv=(Kp+Ki/s+Kds)\Delta Vc \qquad (4),$$

wherein s denotes a Laplace transform operator, Kp denotes a proportional gain, Ki denotes an integral gain, and Kd denotes a differential gain.

At the step S19 of FIG. 3, the CPU of the controller 20 selects either one of the target value $G_D$ or $G_V$ of the acceleration/deceleration calculates at the step S16 or step S18. Thus, the routine of FIG. 3 is returned to the step S6 of FIG. 2.

Figure 6:
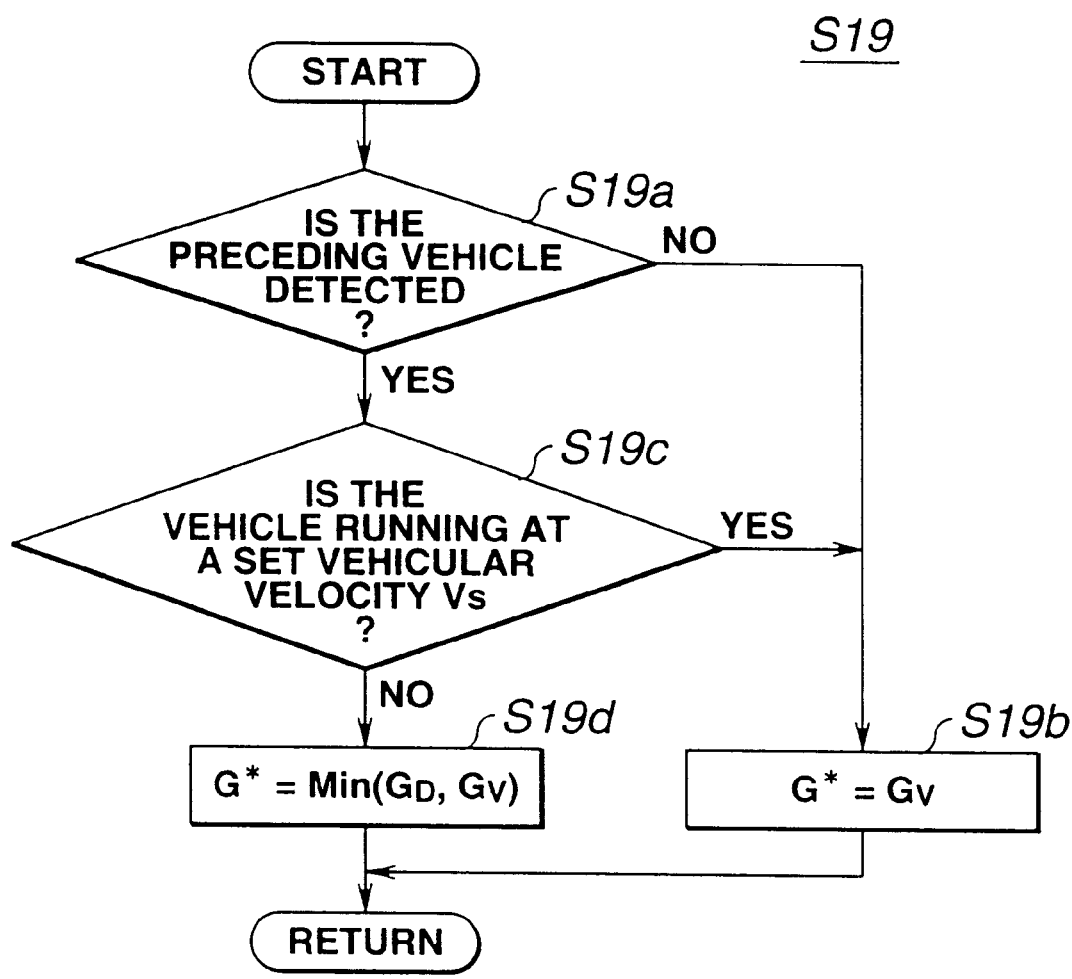
FIG. 6 is another operational flowchart of a subroutine at a step S19 shown in FIG. 2.

Then, the selection processing at the step S19 is carried out as a subroutine of FIG. 6.

That is to say, at a step S19a, the CPU of the controller 20 determines whether the preceding vehicle is present in the front detection zone of the vehicle in the same way as described in the step S11. If D>$D_{MAX}$ (No), the routine jumps to a step S19b in which the target value Gv of the acceleration/deceleration derived according to the target value Vc* of the vehicular velocity at the step S18 is selected as the target value G* of the acceleration/deceleration (Gv→G*) and the routine of FIG. 6 is returned to the step S6. If D≦$D_{MAX}$ (Yes) at the step S19a, the routine goes to a step S19c.

At the step S19c, the CPU of the controller 20 determines whether the vehicle is under the running state at the set vehicular velocity Vs.

If the vehicular velocity is under the set vehicular velocity Vs, the routine goes to the step S19b.

If the vehicular run is not under the set vehicular velocity Vs, the routine goes to a step S19d. At the step S19d, the CPU of the controller 20 compares the target value $G_D$ of the vehicular acceleration/deceleration on the basis of the inter-vehicle distance calculated at the step S16 with the target value Gv of the vehicular acceleration/deceleration on the basis of the vehicular velocity calculated at the step S18 to select which one is lower than the other as the target value G* of the acceleration/deceleration. Then, the routine goes to the step S6 of FIG. 2.

In addition, if the result of the determination at the step S12 of FIG. 3 indicates that the vehicle is running at the constant inter-vehicle time duration (Yes), the routine goes to a step S20.

At the step S20, the CPU of the controller 20 multiplies the present vehicular velocity Vc(n) by a predetermined value T1 to calculate the target value D* of the inter-vehicle distance (D*=Vc(n)×T1) and sets "0" as the target value Vr* of the relative velocity.

Then, the routine goes to the step S16 to calculate the target value $G_D$ of the vehicular acceleration/deceleration.

Hence, suppose now that the vehicle is running on a normal running traffic lane with the vehicular run controller being effected to follow up the preceding vehicle. When, in this state, no preceding vehicle running ahead of the vehicle on the same traffic lane as the vehicle, the routine of FIG. 3 goes from the step S11 directly to the step S17. At the step S17, the CPU of the controller 20 sets the previously set vehicular velocity Vs as the target value Vc* of the vehicular velocity as the routine goes to a step S18.

Hence, at the step S18, the arithmetic operation processing on the target value of the acceleration/deceleration is executed as the subroutine of FIG. 5.

In details, the CPU of the controller 20 subtracts the actual vehicular velocity Vc(n) from the target value Vc* of the vehicular velocity to calculate the deviation ΔVc of the vehicular velocity. Upon the calculation of the equation (4) based on the deviation ΔVc, the CPU of the controller 20 calculates the target value Gv of the acceleration/deceleration to perform the PID (Proportional-Integral-Differential) control for the vehicular velocity.

After the end of the subroutine of FIG. 5, the routine is returned to the step S19.

Since no preceding vehicle is detected at the step S12, the CPU of the controller 20 determines the above-described target value of the acceleration/deceleration as the final target value G* of the acceleration/deceleration and outputs an acceleration or deceleration command value to either the braking controller 8 or the engine output controller 9 to perform the adjustment of the vehicular acceleration/deceleration on the basis of the final target value G* of the acceleration/deceleration.

In details, if the actual vehicular velocity vc is low as compared with the target value Vc* of the vehicular velocity, the deviation ΔVc of the vehicular velocity is positive. Hence, the final target value Vc* is also positive. Then, the controller 20 outputs the acceleration command to the engine output controller 9 so as to widely open the throttle valve to accelerate the vehicle. At this time, the vehicular velocity is made coincident with the target value Vc* of the vehicular velocity.

On the contrary, if the actual vehicular velocity Vc is high as compared with the target value Vc* of the vehicular velocity, the deviation ΔVc of the vehicular velocity indicates negative and, hence, the final target value G* of the acceleration/deceleration also indicates negative.

At this time, the controller 20 outputs the deceleration command value to the braking controller 8 so as to generate a braking force through each disc brake to decelerate the vehicle. Hence, the vehicular velocity is finally made congruent with the target value Vc* of the vehicular velocity.

Then, suppose that the vehicle becomes the detectable state of the preceding vehicle running ahead of the vehicle on the same traffic lane after the vehicle has been undetectable state of the preceding vehicle. In this case, the routine of FIG. 3 goes from the step S11 to the step S12. Since the vehicle is not running at the constant inter-vehicle time duration, the routine goes form the step S12 to the step S13. At the step S13, the CPU of the controller 20 refers to the control map shown in FIG. 7 to determine the magnitude of the deceleration on the basis of the relative velocity Vr and the inter-vehicle distance D.

At this time, since the vehicle has followed up the preceding vehicle, the relative velocity Vr indicates negative.

If the inter-vehicle distance D indicates an upper region located above the straight line L2, the vehicle continues to run at the set vehicular velocity Vs. If the inter-vehicle distance D indicates a lower value such as to be lowered than the straight line L2, the weak deceleration $G_L$ having the relatively small value is calculated.

Then, the routine of FIG. 3 goes to the step S14 to calculate the minimum value $D^*_{MIN}$ of the target inter-vehicle distance. Then, at the step S15, this deceleration GL is integrated to derive the target value Vr* of the vehicular velocity and the target value Vr* is further integrated to derive the target value D* of the inter-vehicle distance.

At the step S16, the deviations DΔ of the inter-vehicle distance and ΔVr of the vehicular velocity are derived and the target value GD of the acceleration/deceleration is calculated on the basis of the deviations DΔ and ΔVr in accordance with the equation (3).

Then, at the step S17, since the present vehicular velocity Vc(n) is lower than the set vehicular velocity Vs, the CPU of the controller 20 calculates the target value Vc* of the vehicular velocity such that the vehicular velocity is increased at a constant acceleration up to the set vehicular velocity Vs. At the step S18, the target value Gv of the acceleration/deceleration indicates positive.

Hence, at the next step S19, the CPU of the controller 20 compares the target value $G_D$ of the acceleration/deceleration on the basis of the vehicular velocity calculated at the step S18. Since $G_D<G_V$, the target value $G_D$ is selected as the final target value G* of the acceleration/deceleration. Then, the controller 20 outputs the weak deceleration command to the braking controller 20 to operate the disc brakes 7 to decelerate the vehicle at a relatively low acceleration state.

Since, therefore, the vehicular velocity Vc(n) is gradually reduced so that the relative velocity Vr becomes approached to zero and the inter-vehicle distance D is also reduced, the vehicle runs in the constant inter-vehicle time duration state in which the vehicular velocity becomes approximately coincident with the target value of the inter-vehicle distance Du* in the steady state.

In this way, when the vehicle runs in the constant inter-vehicle time duration state, the routine of FIG. 3 goes from the step S12 to the step S20 in which the target value of the inter-vehicle distance D* which is the multiplication of the vehicular velocity Vc(n) by the predetermined value T1 so that the target value Vr* of the relative velocity indicates zero. Hence, the target value $G_D$ of the vehicular acceleration/deceleration indicates approximately zero at the step S16. In addition, since this target value $G_D$ is lower than the target value Gv calculated at the step S18, the vehicle can be continued at the constant inter-vehicle time duration state.

In this state, if the preceding vehicle is, in turn, decelerated, the relative velocity Vr is accordingly increased in the negative direction so that the vehicle is also decelerated. If the preceding vehicle is, in turn, accelerated, the relative velocity Vr is accordingly increased in the positive direction so that the vehicle is also accelerated.

In a case where the vehicle is running to follow up the preceding vehicle with the vehicular run controller 20 effected to control the vehicular velocity and the vehicle has detected via the inter-vehicle distance sensor 12 that a new preceding vehicle has interrupted the forward run of the vehicle, the inter-vehicle distance D(n+1) after the interruption of the new preceding vehicle gives, for example, an approximately half the inter-vehicle distance D(n) detected immediately before the interruption of the new preceding vehicle.

In this case, in the fourth previously proposed vehicular velocity controlling apparatus described in BACKGROUND OF INVENTION, a large deceleration would be developed in order to maintain the target inter-vehicle distance generally before the interruption of the new preceding vehicle.

However, in the first embodiment, in this case, the target value of the vehicular deceleration is set by referring to the control map of FIG. 7.

Hence, when the relative velocity of the vehicle to the new preceding vehicle is placed in the vicinity to zero, the target value $G_L$ of the deceleration having the relatively low value to make the vehicular deceleration weak is set. Consequently, the new preceding vehicle interrupting the forward run of the vehicle becomes gradually separated from the vehicle so that the prevention of the disagreeable sense from being given to the vehicular driver can be assured.

Even if the inter-vehicle distance of the vehicle to the new preceding vehicle is approximately half the target value Du* of the inter-vehicle distance in the steady state, the vehicular deceleration is made weak when the relative velocity Vr of the vehicle to the new preceding vehicle indicates positive, viz., the vehicular velocity of the new preceding vehicle is faster than that of the vehicle. When the vehicular velocity of the new preceding vehicle is considerably faster than that of the preceding vehicle, the vehicular velocity is increased to be coincident with the set vehicular velocity Vs.

On the contrary, when the relative velocity Vr to the new preceding vehicle indicates negative, viz., the vehicular velocity of the new preceding vehicle is slower than that of the vehicle, the target value $G_M$ of the vehicular deceleration is set to the intermediate deceleration for the vehicle to run at the intermediate deceleration between the strong and weak decelerations.

Furthermore, when the relative velocity Vr is increased in the negative direction with the inter-vehicle distance D shortened or with the inter-vehicle distance D unchanged, the target value GH of the vehicular deceleration is set to the large deceleration for the vehicle to run at the strong deceleration. Consequently, the vehicle is decelerated at a high rate so that the sufficient inter-vehicle distance to the new preceding vehicle can be assured.

Since, in the first preferred embodiment, the magnitude of the deceleration is set on the basis of the inter-vehicle distance and the relative velocity, the vehicular motion which matches with the drive feeling of the vehicular driver can be achieved irrespective of such an external disturbance as giving an adverse effect on the vehicular acceleration/deceleration. The external disturbance includes the vehicular velocity region, the deceleration by the new preceding vehicle, and a descending slope.

In addition, the vehicular motion which matches with the drive feeling of the vehicular driver can be achieved irrespective of the velocity of the new preceding vehicle.

Furthermore, since no strong deceleration is carried out at the time of the deceleration start, almost no disagreeable feeling is given to the vehicular driver.

Second Embodiment

Next, in a second preferred embodiment of the automatic vehicular velocity controlling apparatus according to the present invention will be described with reference to FIGS. 8 through 14.

In the second embodiment, when the new preceding vehicle is detected during the old preceding vehicle follow-up run control by the vehicular run controller 20, the controller 20 decides whether the detection of the new preceding vehicle is caused by a traffic lane change by the vehicle or by the lane change of the interruption of the new preceding vehicle from another traffic lane to the same traffic lane of the vehicle and an optimum preceding vehicle follow-up run can be achieved according to the decision of the controller 20.

Figure 8:
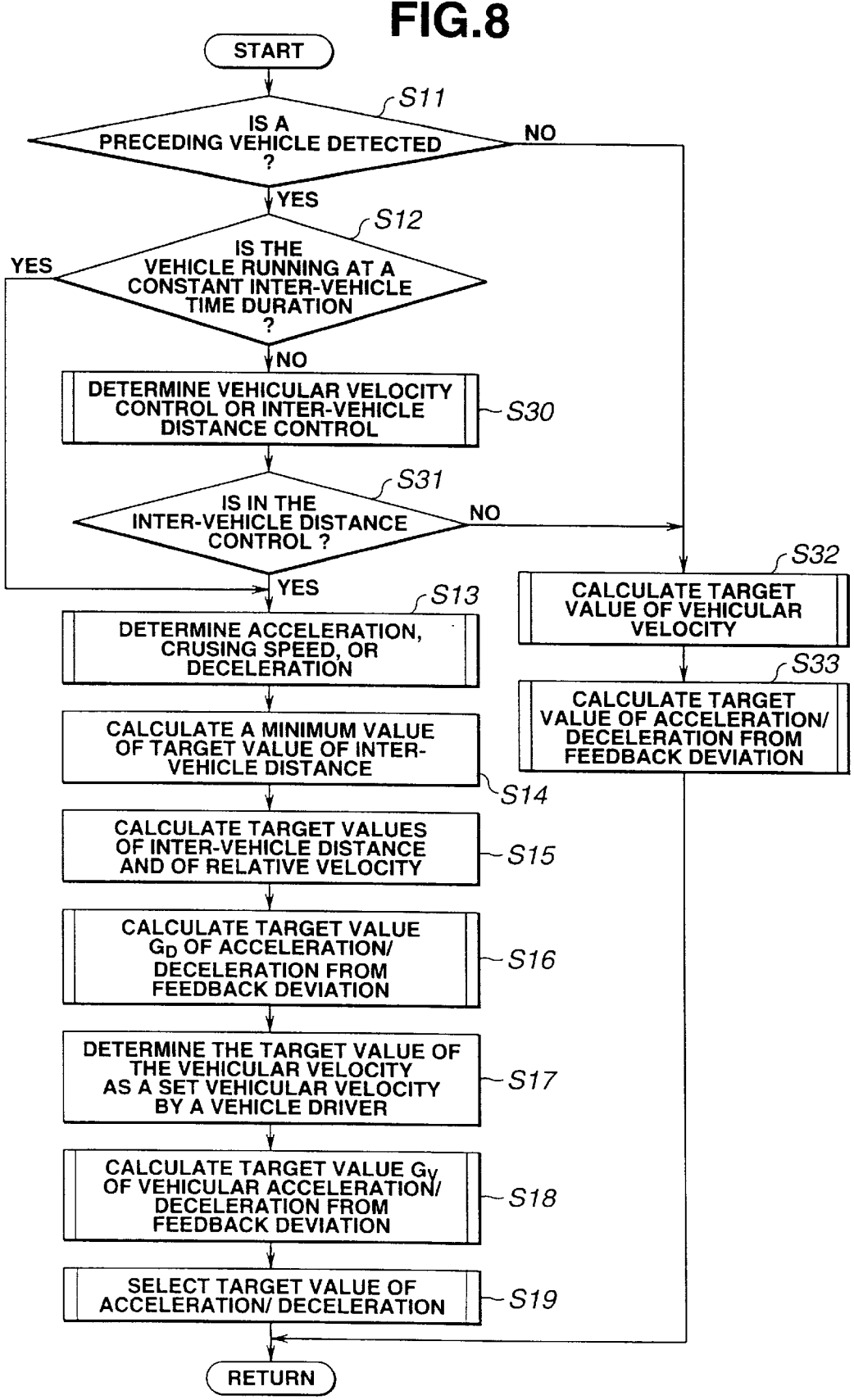
FIG. 8 is another operational flowchart representing another example of a subroutine at the step S5 shown in FIG. 2 and executed in the controller in a second preferred embodiment of the automatic vehicular velocity controlling apparatus.

FIG. 8 shows another subroutine executed at the step S5 of FIG. 2 in the second embodiment.

The contents of the same numbered steps in FIG. 8 as those shown in FIG. 3 are the same as those steps in FIG. 8.

As shown in FIG. 8, a step S30 at which the CPU of the controller 20 determines if either the vehicular velocity control or the inter-vehicle distance control should be carried out is interposed between the steps S12 and S13.

At a step S31 at which the control to be decided to be carried out at the step S30 is the inter-vehicle distance control or the vehicular velocity control is interposed between the steps S30 and S13.

If the result of determination at the step S31 indicates the inter-vehicle distance control (Yes), the routine goes to the step S13. If the result of determination at the step S31 indicates the vehicular velocity control (No), the routine goes to a step S32 to calculate the target value of the vehicular velocity. At the next step S33, the CPU of the controller 20 calculates the target value Gv of the vehicular acceleration/deceleration in the same manner as described at the step S18 shown in FIG. 3. Then, the subroutine of FIG. 8 is ended. If the result of determination at the step S11 indicates that no preceding vehicle is detected (No), the routine goes to the step S32. If the result of determination at the step S12 indicates that the preceding vehicle is detected (Yes), the routine goes to the step S13. The other steps shown in FIG. 8 are the same as those shown in FIG. 3. The detailed explanation thereof will herein be omitted.

It is noted that, at the step S30, the CPU of the controller 20 refers to a control map shown in FIG. 10 on the basis of the relative velocity Vr and the inter-vehicle distance D to decide whether the vehicular running state falls in either the vehicular velocity control region or the inter-vehicle distance control region. The control map shown in FIG. 10 is constituted by the two characteristic lines L1 and L2 shown in FIG. 7.

An upper region above these straight lines L1 and L2 is set as the vehicular velocity control region and a lower region below these straight lines L1 and L2 is set as the inter-vehicle distance control region.

Figure 9:
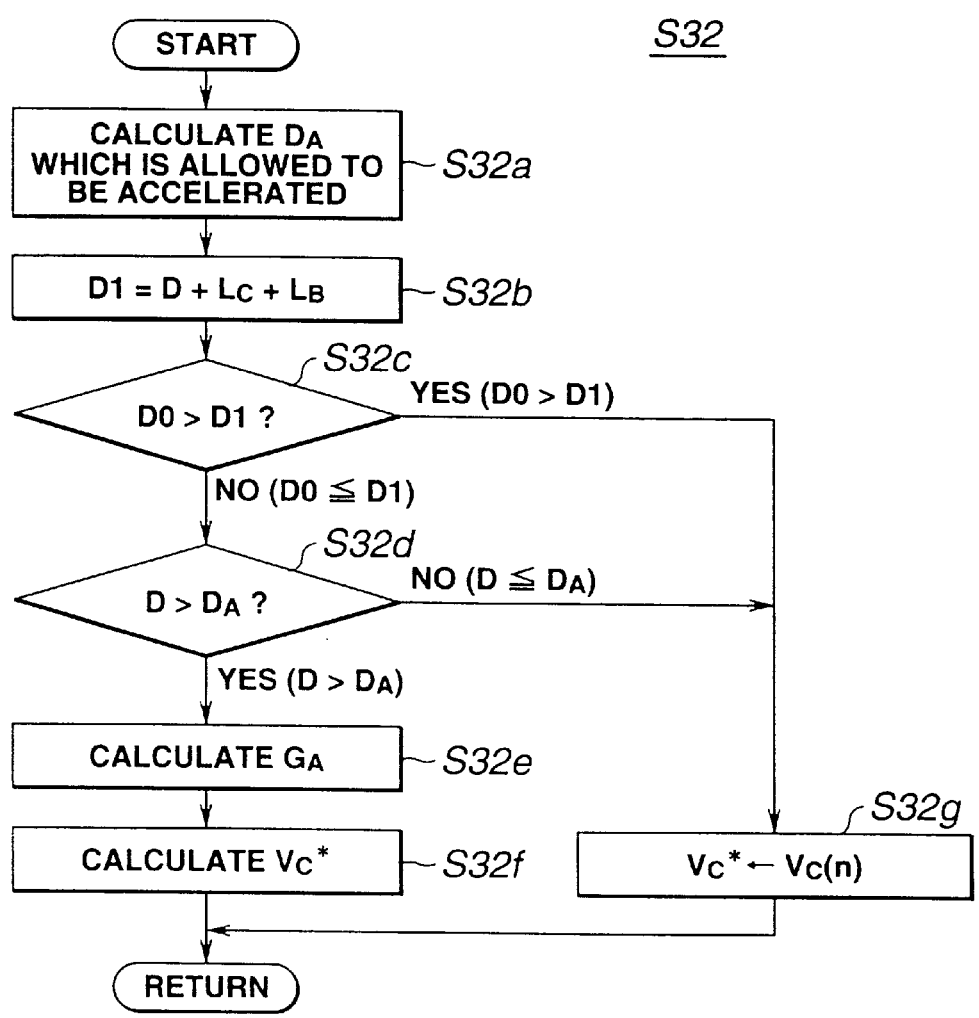
FIG. 9 is another operational flowchart representing a subroutine at a step S32 shown in FIG. 8.

FIG. 9 shows a subroutine executed at the step S32 in FIG. 8.

As shown in FIG. 9, at a step S32a, the CPU of the controller 20 calculates an acceleration enable inter-vehicle distance $D_A$ by referring to a table shown in FIG. 11 on the basis of the relative velocity Vr and the vehicular velocity Vc(n).

The table shown in FIG. 11 is such that an approximately inter-vehicle distance $D_M$ is set when the vehicular velocity Vc(n) of the vehicle is low and when the relative velocity Vr is low (small), a long inter-vehicle distance $D_L$ is set when the vehicular velocity Vc (n) of the vehicular velocity is low and the relative velocity Vr is high (large), a short inter-vehicle distance Ds is set when the vehicular velocity Vc(n) is low and the relative velocity Vr is high (large), and the approximately intermediate distance $D_M$ is set when the vehicular velocity Vc(n) of the vehicle is high (large) and the relative velocity Vr is large (high).

Next, the routine goes to a step S32b.

At the step S32b, the CPU of the controller 20 adds the present inter-vehicle distance D, a length of the preceding vehicle Lc, and a braking distance $L_B$ required when the preceding vehicle is supposed to be the interrupt vehicle to calculate a predictive inter-vehicle distance D1 (=D+Lc+$L_B$).

Then, the routine goes to a step S32C.

At the step S32c, the CPU of the controller 20 compares the inter-vehicle distance D0 which is detected at a time immediately before the new preceding vehicle has appeared with the predictive inter-vehicle distance D1 calculated at the step S32b to determine if D0>D1.

If D0≦D1 at the step S32 (No), the CPU of the controller 20 determines that the inter-vehicle distance has not exceeded the predictive inter-vehicle distance D1 due to the traffic lane change of the vehicle to another traffic lane and the routine goes to a step S32d.

If D0>D1 (Yes) at the step S32c, the routine goes to a step S32g.

Then, at the step S32d, the CPU of the controller 20 decides whether the present inter-vehicle distance D is in excess of the acceleration enabling inter-vehicle distance $D_A$. If D>$D_A$ (Yes) at the step S32d, the CPU of the controller 20 determines that the inter-vehicle distance D is sufficient for the vehicle to be accelerated and the routine goes to a step S32e. At the step S32e, the CPU of the controller 20 calculates such a target value $G_A$ of the acceleration that the inter-vehicle distance D is made coincident with the target value Du* of the inter-vehicle distance in the steady state when the vehicle is accelerated at the constant acceleration and the relative velocity Vr indicates zero.

The target value $G_A$ of the acceleration is calculated in accordance with the following equation (5).

$$G_A = Vr^2/2(Du^*-D) \qquad (5).$$

Next, the routine goes to a step S32f.

At the step S32f, the CPU of the controller 20 calculates the target value Vc* of the vehicular velocity in accordance with the following equation (6) and the routine is ended.

$$Vc^*(n) = Vc^*(n-1) + G_A \times Ts \qquad (6).$$

In the equation (6), Vc*(n−1) denotes a previous value of the target value Vc*(n) and Ts denotes a sampling time at the timer interrupt routine.

As described above, if D0≧D1 at the step S32c, the CPU of the controller 20 determines that another vehicle has made the traffic lane change from another traffic lane to the same traffic lane on which the vehicle is running as the interrupt preceding vehicle and the routine goes to the step S32g.

At the step S32g, the CPU of the controller 20 sets the present vehicular velocity Vc(n) as the target value Vc*of the vehicular velocity. Then,the subroutine of FIG. 9 is ended.

Suppose now that the vehicle is running at the constant inter-vehicle time duration during the detection of the preceding vehicle. In this state, the relative velocity is approximately zero and the inter-vehicle distance D is made congruent to the target value Du* of the inter-vehicle distance in the steady state.

Hence, the routine shown in FIG. 8 goes from the step S12 to the step S13.

Figure 12:
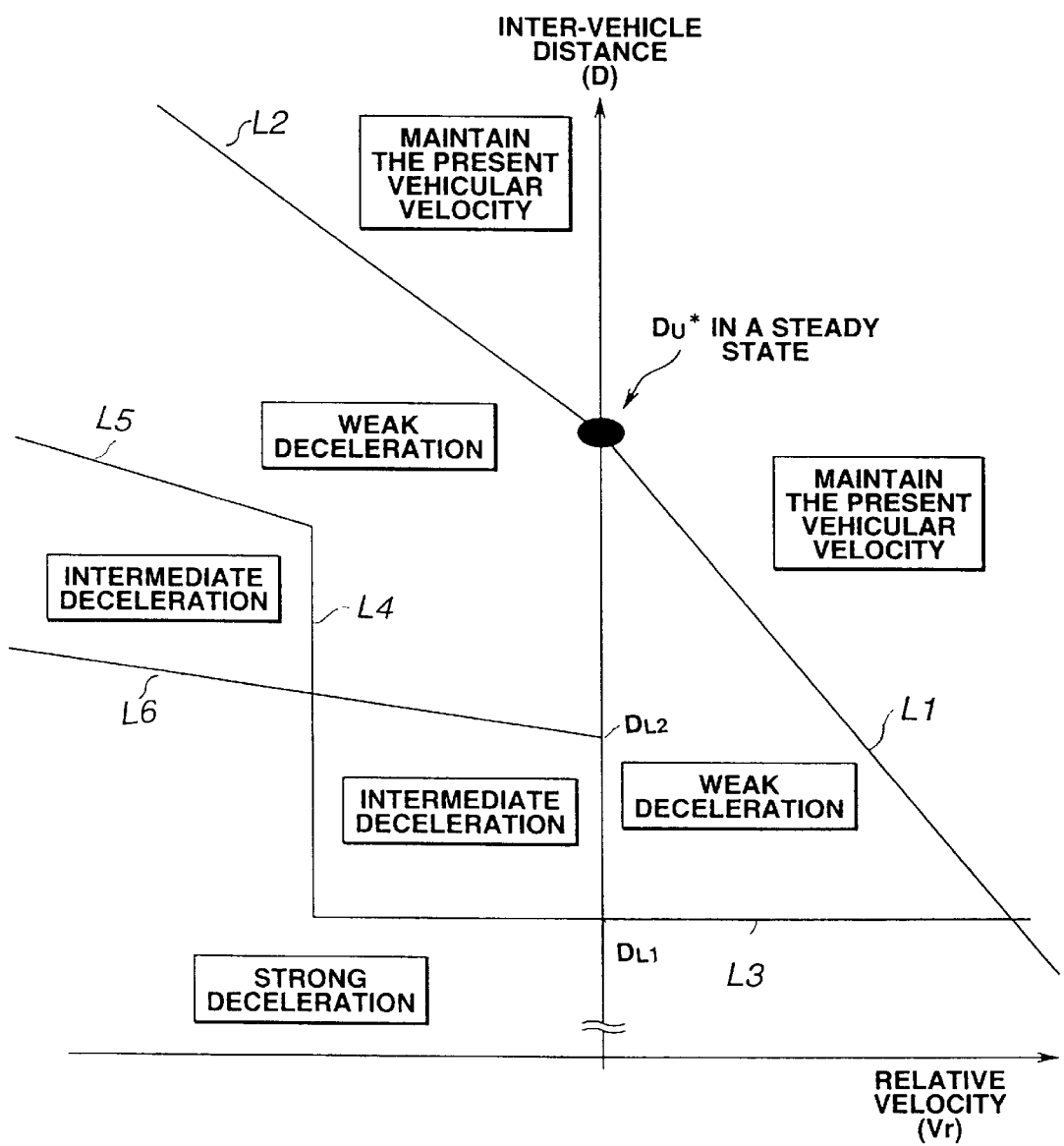
FIG. 12 is an explanatory view of the control map used in the second embodiment.

When referring to the control map shown in FIG. 12, the vehicular deceleration is set to zero or to the weak deceleration to continue the constant inter-vehicle time duration in the same manner as the first embodiment.

Figure 14A:
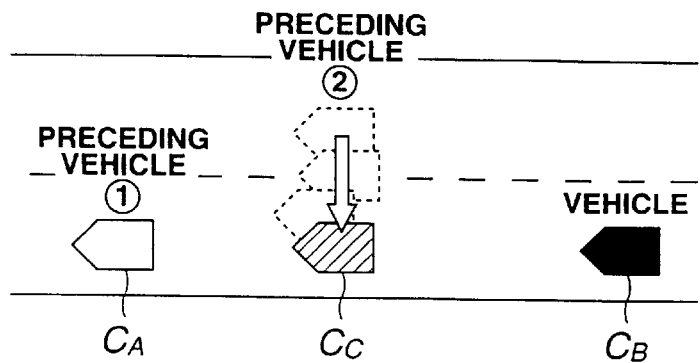
FIGS. 14A, 14B, 14C, and 14D are explanatory views for explaining operations of the automatic vehicular velocity controlling apparatus in the case of the second embodiment when an interruption of another vehicle before the vehicle occurs, when the vehicle has made a traffic lane change to another traffic lane, when a preceding vehicle has made the traffic lane change, and when the vehicle has made the traffic lane change, respectively.

Suppose that, under the continuation of the vehicular run at the constant inter-vehicle time duration, another vehicle $C_C$ which has been running on a car over-head traffic lane has interrupted between the (old) preceding vehicle $C_A$ and the vehicle $C_B$ as shown in FIG. 14A.

Figure 14B:
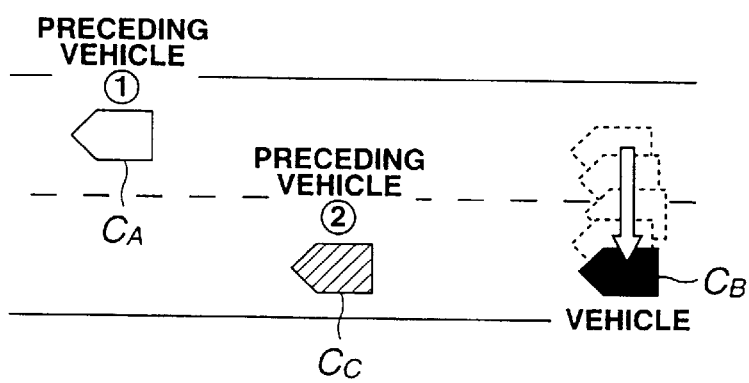

Or, suppose that, under the same state, the vehicle $C_B$ has made the traffic lane change from the other traffic lane to the present traffic lane and the inter-vehicle distance of the vehicle to the new preceding vehicle $C_C$ as shown in FIG. 14B and the inter-vehicle distance D to the new preceding vehicle $C_C$ is shorter than the old preceding vehicle $C_A$.

The inter-vehicle distance D between the interrupting vehicle $C_C$ and the vehicle $C_B$ is made shorter than the inter-vehicle distance to the old preceding vehicle $C_A$.

In this case, in the routine shown in FIG. 8, the routine goes from the step S12 to the step S13. At this time, the inter-vehicle distance D is decreased. However, in a case where the vehicular velocity of the interrupting preceding vehicle $C_C$ is equal to or lower than the vehicular velocity Vc(n) of the vehicle, the CPU of the controller 20 refers to the control map shown in FIG. 10 and the control is, in FIG. 10, in turn, returned to the inter-vehicle distance control region in FIG. 10.

Hence, the routine shown in FIG. 8 goes from the step S31 to the step S13. In the same manner as the first embodiment, the target value $G_D$ of the acceleration based on the inter-vehicle distance is calculated and the target value $G_V$ based on the vehicular velocity is calculated. Then, at the step S19, the CPU of the controller 20 selects the smaller one of these target values $G_D$ or $G_V$ so that the weak deceleration is carried out.

On the other hand, if the vehicular velocity of the interrupting vehicle $C_C$ is faster than the vehicular velocity Vc(n) of the vehicle $G_B$, the control mode indicates the upper region of the straight line L1 in the control map of FIG. 10 which corresponds to the vehicular velocity control region. Consequently, the routine goes from the step S31 to the step S32.

Hence, on the basis of the relative velocity Vr and the vehicular velocity Vc(n), the CPU of the controller 20 refers to the table shown In FIG. 11 to calculate the acceleration enable inter-vehicle distance $D_A$.

Therefore, if the vehicular velocity Vc(n) is low, the approximately intermediate inter-vehicle distance $D_M$ is set when the relative velocity is small and the short inter-vehicle distance Ds is set when the relative velocity is large.

Then, the routine goes to the step S32b of FIG. 9 to calculate the predictive inter-vehicle distance D1.

Figure 13:
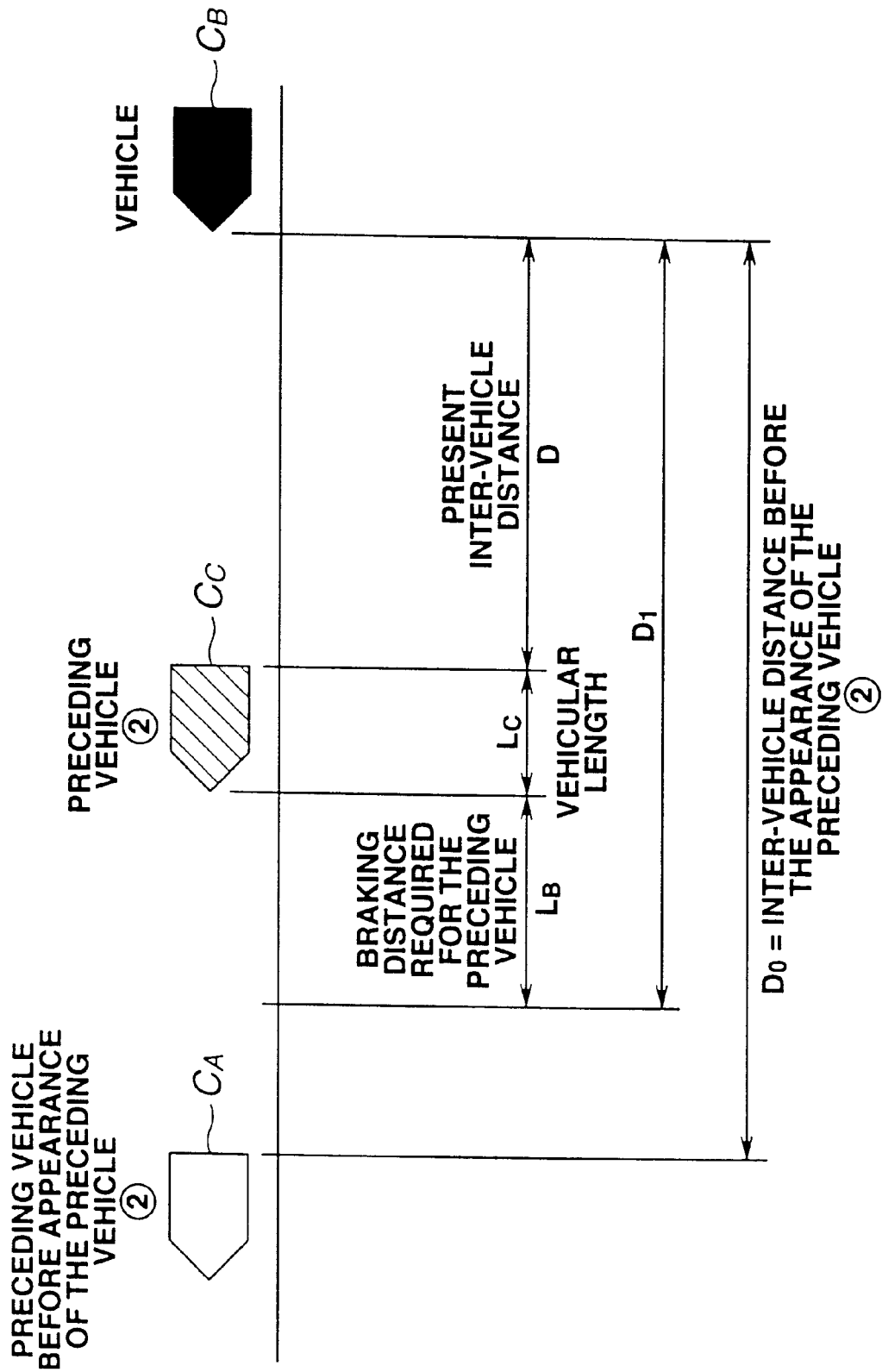
FIG. 13 is an explanatory view for explaining a predictive inter-vehicle distance when another vehicle is interrupted before the vehicle in the case of the second embodiment.

It is noted that the predictive inter-vehicle distance D1 is calculated is the addition value of the present inter-vehicle distance D to the interrupting vehicle Cc, the length Lc of the interrupting vehicle Cc, and the braking distance $L_B$ requiring the interrupting vehicle Cc, as shown in FIG. 13.

When the predictive inter-vehicle distance D1 is shorter than the inter-vehicle distance D0 to the old preceding vehicle $C_A$ immediately before the interruption, the CPU of the controller 20 determines that the other vehicle running at the other traffic lane is interrupted onto the same traffic lane. Then, the routine goes to the step S32g at which the present vehicular velocity Vc(n) is set as the target value Vc* of the vehicular velocity to maintain the present vehicular velocity.

Thereafter, when the predictive inter-vehicle distance D1 is in excess of the inter-vehicle distance D0, the routine of FIG. 9 goes from the step S32c to the step S32d. If the present inter-vehicle distance D exceeds the acceleration enable inter-vehicle distance $D_A$, the routine of FIG. 9 goes to the step S32e. At the step S32e, the CPU of the controller 20 calculates the target value GA of the vehicular acceleration such that the inter-vehicle distance D is made congruent to the target value Du* of the inter-vehicle distance in the steady state when the vehicle is accelerated at the constant acceleration and the relative velocity Vr indicates zero and calculates the target value Vc* of the vehicular velocity corresponding to the target value GA of the acceleration calculated for the vehicle to be accelerated.

Figure 14C:
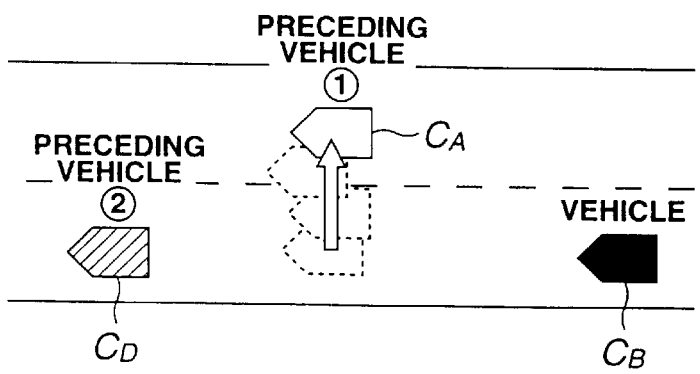
Figure 14D:
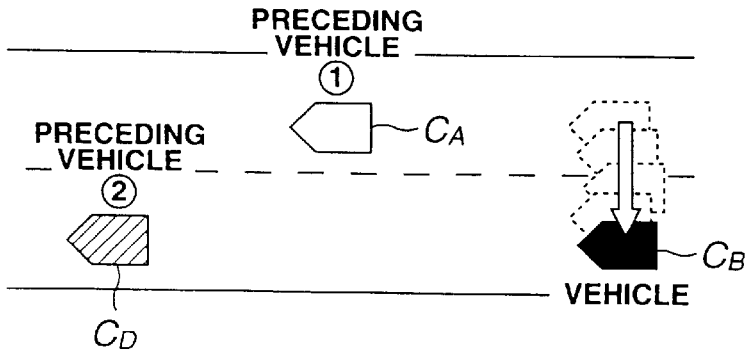

In addition, suppose that, as shown in FIG. 14C, the preceding vehicle $C_A$ has made the traffic lane change from the same traffic lane as the vehicle to the other traffic lane so that the inter-vehicle distance to the new preceding vehicle is widened. Or suppose that, as shown in FIG. 14D, the vehicle has made the traffic lane change from the original traffic lane to the other traffic lane so that the inter-vehicle distance to the new preceding vehicle is widened.

In either case, if the velocity of the new preceding vehicle is lower than that of the vehicle Vc(n) according to the relative velocity Vr to the new preceding vehicle and the inter-vehicle distance D, the vehicular run controller 20 carries out the inter-vehicle distance control. If the velocity of the preceding vehicle is faster than that of the vehicle, the vehicular run controller 20 carries out the velocity control.

In the second embodiment, when the new preceding vehicle is detected as the preceding vehicle due to the traffic lane change of the vehicle or the interruption of the other vehicle onto the traffic lane on which the vehicle is running and the relationship to the new preceding vehicle becomes different from that to the old preceding vehicle, the controller 20 decides to carry out either the vehicular velocity control or the inter-vehicle distance control according to the running condition of the preceding vehicle.

The control according to the decision is carried out so that the optimum preceding vehicle follow-up run control according to the running condition can be achieved.

In the second embodiment, at the step S32f, the CPU of the controller 20 performs the arithmetic operation on the equation (6) to calculate the target value Vc* of the vehicular velocity.

However, the target value $G_A$ of the acceleration calculated at the step S32e may be integrated to derive the target value of the relative velocity and the target value of the inter-vehicle distance may further be integrated to derive the target value of the inter-vehicle distance. The acceleration control may be carried out so that the present inter-vehicle distance and relative velocity may be congruent to these target values, respectively.

In each of the first and second embodiments, the vehicular velocity feedback equation of (4) is in the form of the PID control. However, a P (Proportional) control or a PD (Proportional-Differential) control may be applied to the velocity equation of (4).

In each of the first and second embodiments, the vehicular velocity Vc(n) is derived by the average value of the driven wheels. However, the vehicular velocity may be derived by a revolution velocity of an output axle on the automatic transmission 3 or alternatively may be derived by means of a vehicular body calculator used in an anti-skid braking controller.

In each embodiment, the automatic transmission 3 is disposed on the output side of the engine 2. However, a continuously variable transmission (CVT) may be disposed on the output side of the engine.

In each embodiment, the present invention is applicable to the rear-wheel-drive vehicle.

However, the present invention is applicable to a front-wheel-drive vehicle or a four-wheel-drive (4WD) vehicle. Or alternatively, the present invention is applicable to an electric vehicle to which an electric motor is applied in place of the engine 2. Furthermore, the present invention is applicable to a hybrid vehicle in which both of the engine and the motor are used together as a prime mover. In this case, an electric motor controller may be applied in place of the engine output controller.

A control apparatus for an automotive vehicle comprises: an inter-vehicle distance detector to detect an actual inter-vehicle distance which is running ahead of the vehicle on the same traffic lane as the vehicle; and a controller programmed to: calculate a target value of a vehicular velocity variation rate on the basis of the actual value of the inter-vehicle distance; to perform a follow-up run control for the vehicle to follow up the preceding vehicle according to the target value of the vehicular velocity variation rate and to maintain the inter-vehicle distance from the vehicle to the preceding vehicle at the target value of the same; being responsive to a detection of a new preceding vehicle by the inter-vehicle distance detector, calculate the target value of the vehicular velocity variation rate on the basis of a new inter-vehicle distance from the vehicle to the new preceding vehicle and a variation rate of the new inter-vehicle distance; and vary the vehicular velocity on the basis of the target value of the vehicular velocity variation rate until the new inter-vehicle distance is made substantially equal to a target value of the inter-vehicle distance from the vehicle to the preceding vehicle in a steady state.

The entire contents of Japanese Patent Application No. Heisei 10-207753 filed Jul. 23, 1998 are herein incorporated by reference.

Although the invention has been described above by reference to certain embodiments of the invention, the present invention is not limited to the embodiments described above. Modifications and variations of the embodiments described above will occur to those skilled in the art in light of the above teachings.

The scope of the present invention is defined with reference to the following items.

What is claimed is:

1. A control apparatus for an automotive vehicle, comprising:
   an inter-vehicle distance detector to detect an actual inter-vehicle distance which is running ahead of the vehicle on the same traffic lane as the vehicle; and
   a controller programmed to:
   calculate a target value of a vehicular velocity variation rate on the basis of the actual value of the inter-vehicle distance and a target value of the same;
   perform a follow-up run control for the vehicle to follow up the preceding vehicle according to the target value of the vehicular velocity variation rate and to maintain the inter-vehicle distance from the vehicle to the preceding vehicle at the target value of the same;
   responsive to a detection of a new preceding vehicle by the inter-vehicle distance detector, where the new preceding vehicle has a different inter-vehicle distance than the target inter-vehicle distance, calculate a target vehicle motion to be a transitional vehicle motion of the vehicle until a new inter-vehicle distance from the vehicle to the new preceding vehicle is made substantially equal to the target value of the inter-vehicle distance from the vehicle to the preceding vehicle; and
   adjust the vehicular velocity variation rate in such a manner that the vehicular motion becomes the target vehicular motion.

2. A control apparatus for an automotive vehicle as claimed in claim 1, wherein the controller is programmed to calculate the target vehicular motion on the basis of the inter-vehicle distance from the vehicle to the new preceding vehicle and a relative velocity of the vehicle to the new preceding vehicle.

3. A control apparatus for an automotive vehicle as claimed in claim 1, wherein the controller is programmed to calculate the target value of the vehicular velocity variation rate as the target vehicular motion.

4. A control apparatus for an automotive vehicle as claimed in claim 1, wherein the controller is programmed to calculate target values of the inter-vehicle distance from the vehicle to the new preceding vehicle and of a relative velocity of the vehicle to the new preceding vehicle as the target vehicular motion.

5. A control apparatus for an automotive vehicle as claimed in claim 1, wherein the controller is programmed to calculate the target vehicular motion such that the vehicle once approaches to the new preceding vehicle when the relationship between a relative velocity of the vehicle to the preceding vehicle and the inter-vehicle distance from the vehicle to the new preceding vehicle gives a predetermined relationship.

6. A control apparatus for an automotive vehicle as claimed in claim 5, wherein the controller is programmed to calculate a minimum value of the target value of the inter-vehicle distance when the controller is programmed to calculate the target vehicular motion for the vehicle to once approach to the preceding vehicle, and is programmed to calculate the target vehicular motion within a range such that the target vehicular motion is at least one of being equal to and being greater than the minimum value of the target value of the inter-vehicle distance.

7. A control apparatus for an automotive vehicle as claimed in claim 6, wherein the controller is programmed to calculate the minimum value of the target value of the inter-vehicle distance using at least one of the vehicular velocity of the vehicle and the vehicular velocity of the new preceding vehicle.

8. A control apparatus for an automotive vehicle as claimed in claim 6, wherein the controller is programmed to multiply the vehicular velocity of the preceding vehicle by a constant to calculate the minimum value of the target value of the inter-vehicle distance.

9. A control apparatus for an automotive vehicle as claimed in claim 6, wherein the controller is programmed to multiply the vehicular velocity of the vehicle by a constant to calculate the minimum value of the target value of the inter-vehicle distance.

10. A control apparatus for an automotive vehicle as claimed in claim 1, wherein the controller is programmed to: determine whether the vehicular velocity of the new preceding vehicle exceeds that of the vehicle; determine whether the detected value of the inter-vehicle distance by the inter-vehicle distance detector is at least one of being equal to and being greater than a set inter-vehicle distance; and being responsive to results of the determinations that the vehicular velocity of the new preceding vehicle exceeds that of the vehicle and that actual value of the inter-vehicle distance is at least one of being equal to and being greater than the set inter-vehicle distance to generate and output a vehicular acceleration enable command to enable the acceleration of the vehicle.

11. A control apparatus for an automotive vehicle as claimed in claim 10, wherein the controller is programmed to calculate the set inter-vehicle distance using at least one of the vehicular velocity of the vehicle and a relative velocity of the vehicle to the new preceding vehicle.

12. A control apparatus for an automotive vehicle as claimed in claim 10, wherein the set inter-vehicle distance is set to become longer as a magnitude of the vehicular velocity of the vehicle becomes larger.

13. A control apparatus for an automotive vehicle as claimed in claim 10, wherein the set inter-vehicle distance is set to become shorter as a magnitude of a relative velocity of the vehicle to the new preceding vehicle becomes larger.

14. A control apparatus for an automotive vehicle as claimed in claim 1, wherein the controller is programmed to determine whether the vehicular velocity of the new preceding vehicle exceeds that of the vehicle; being responsive to a result of a determination that the vehicular velocity of the newly detected preceding vehicle exceeds that of the vehicle, to determine whether the new preceding vehicle is the preceding vehicle which is running on another traffic lane onto which the vehicle has made a traffic lane change or which is running on the same traffic lane as the vehicle onto which another vehicle has made the traffic lane change; being responsive to the result of the determination that the new preceding vehicle is the preceding vehicle which is running on the other traffic lane onto which the vehicle has made the traffic lane change to generate and output a vehicular acceleration enable command to enable the acceleration of the vehicle; and being responsive to the result of the determination that the new preceding vehicle is the preceding vehicle which is running ahead of the vehicle on the same traffic lane onto which the other vehicle has made the traffic lane change to generate and output a vehicular acceleration suppress command to suppress the vehicular acceleration.

15. A control apparatus for an automotive vehicle as claimed in claim 14, wherein the controller is programmed to determine whether the new preceding vehicle is the preceding vehicle which is running on the other traffic lane onto which the vehicle has made the traffic lane change or which is running on the same traffic lane as the vehicle onto which the other vehicle has made the traffic lane change on the basis of a relative velocity of the vehicle to the new preceding vehicle and the inter-vehicle distance from the vehicle to the new preceding vehicle.

16. A control apparatus for an automotive vehicle as claimed in claim 11, wherein the controller is responsive to the vehicular acceleration enable command and programmed to set the target vehicular motion in a transient state in such a manner that the actual inter-vehicle distance is made congruent with the target value of the inter-vehicle distance and a relative velocity of the vehicle to the new preceding vehicle is zeroed when the vehicle is accelerated at a constant acceleration.

17. A control apparatus for an automotive vehicle as claimed in claim 16, wherein the target vehicular motion is a calculation of a target value of the vehicular velocity of the vehicle.

18. A control apparatus for an automotive vehicle as claimed in claim 16, wherein the target vehicular motion is a calculation of the target value of the inter-vehicle distance from the vehicle to the new preceding vehicle and a target value of the relative velocity of the vehicle to the new preceding vehicle.

19. A control apparatus for an automotive vehicle, comprising:
inter-vehicle distance detecting means for detecting an actual inter-vehicle distance which is running ahead of the vehicle on the same traffic lane as the vehicle; and
controlling means for calculating a target value of a vehicular velocity variation rate on the basis of the actual value of the inter-vehicle distance and for performing a follow-up run control for the vehicle to follow up the preceding vehicle according to the target value of the vehicular velocity variation rate and to maintain the inter-vehicle distance from the vehicle to the preceding vehicle at the target value of the same, the controlling means being responsive to a detection of a new preceding vehicle, where the new preceding vehicle has a different inter-vehicle distance than the target inter-vehicle distance, by the inter-vehicle distance detecting means for calculating the target value of the vehicular velocity variation rate to be a transitional vehicular velocity variation rate on the basis of a new inter-vehicle distance from the vehicle to the new preceding vehicle and a variation rate of the new inter-vehicle distance and for varying the vehicular velocity on the basis of the target value of the vehicular velocity variation rate until the new inter-vehicle distance is made substantially equal to the target value of the inter-vehicle distance from the vehicle to the preceding vehicle.

20. A control method for an automotive vehicle, comprising:
detecting an actual inter-vehicle distance from the vehicle to a preceding vehicle which is running ahead of the vehicle on the same traffic lane as the vehicle;
calculating a target value of a vehicular velocity variation rate on the basis of the actual value of the inter-vehicle distance and a target value of the same;
performing a follow-up run control for the vehicle to follow up the preceding vehicle according to the calculated target vehicular velocity variation rate;
maintaining the inter-vehicle distance from the vehicle to the preceding vehicle at the target value of the same;
when detecting a new preceding vehicle, where the new preceding vehicle has a different inter-vehicle distance than the target inter-vehicle distance, deriving a target motion of the vehicle to be a transitional vehicle motion of the vehicle until a new inter-vehicle distance from the vehicle to the new preceding vehicle is made substantially equal to the target value of the inter-vehicle distance from the vehicle to the preceding vehicle; and
adjusting the vehicular variation rate in such a manner that the motion of the vehicle gives the derived target motion of the vehicle.

* * * * *